(12) United States Patent
Hoshina et al.

(10) Patent No.: US 9,435,418 B2
(45) Date of Patent: Sep. 6, 2016

(54) WAVE GENERATOR OF STRAIN WAVE GEARING

(71) Applicant: Harmonic Drive Systems Inc., Shinagawa-ku (JP)

(72) Inventors: Tatsuro Hoshina, Azumino (JP); Yoshihide Kiyosawa, Azumino (JP)

(73) Assignee: HARMONIC DRIVE SYSTEMS INC., Shinagawa-Ku, Tokyo (JP)

( * ) Notice: Subject to any disclaimer, the term of this patent is extended or adjusted under 35 U.S.C. 154(b) by 62 days.

(21) Appl. No.: 14/396,504

(22) PCT Filed: May 8, 2013

(86) PCT No.: PCT/JP2013/002967
§ 371 (c)(1),
(2) Date: Oct. 23, 2014

(87) PCT Pub. No.: WO2014/181375
PCT Pub. Date: Nov. 13, 2014

(65) Prior Publication Data
US 2016/0025203 A1 Jan. 28, 2016

(51) Int. Cl.
*F16H 35/00* (2006.01)
*F16H 49/00* (2006.01)
(Continued)

(52) U.S. Cl.
CPC ............. *F16H 49/001* (2013.01); *F16C 19/44* (2013.01); *F16C 19/46* (2013.01); *F16H 2049/003* (2013.01)

(58) Field of Classification Search
CPC .................................................... F16H 49/001
USPC ........................................................... 74/640
See application file for complete search history.

(56) References Cited

U.S. PATENT DOCUMENTS

| | | | | |
|---|---|---|---|---|
| 5,626,055 A | * | 5/1997 | Fukui | .................... B23Q 16/024 |
| | | | | 192/146 |
| 6,526,849 B1 | * | 3/2003 | Ishikawa | ............. F16H 55/0833 |
| | | | | 74/457 |

(Continued)

FOREIGN PATENT DOCUMENTS

| | | |
|---|---|---|
| JP | 3-99257 U | 10/1991 |
| JP | 5-132292 A | 5/1993 |

(Continued)

OTHER PUBLICATIONS

International Search Report (PCT/ISA/210) mailed on Jul. 2, 2013, by the Japanese Patent Office as the International Searching Authority for International Application No. PCT/JP2013/002967.

*Primary Examiner* — Ha D Ho
(74) *Attorney, Agent, or Firm* — Buchanan Ingersoll & Rooney PC

(57) ABSTRACT

A wave generator of a hollow strain wave gearing has a rigid plug and a needle roller bearing. The needle roller bearing has an inner ring trajectory surface formed in the plug external peripheral surface, a flexible outer ring, an outer ring trajectory surface formed in an inner peripheral surface of the outer ring, and needle rollers. An inner ring trajectory groove is formed in the plug external peripheral surface, and the inner ring trajectory surface is formed in a groove bottom surface of the inner ring trajectory groove. Inner-ring-side restricting surfaces for restricting the needle rollers from moving in the center axis direction are formed in groove side surfaces on both sides of the inner ring trajectory groove. A wave generator can be obtained, which is suitable for increasing the hollow diameter of a strain wave gearing.

4 Claims, 4 Drawing Sheets

(51) Int. Cl.
  *F16C 19/44*  (2006.01)
  *F16C 19/46*  (2006.01)

(56) References Cited

U.S. PATENT DOCUMENTS

| | | | | |
|---|---|---|---|---|
| 7,086,309 | B2* | 8/2006 | Stoianovici | F03C 1/04 |
| | | | | 74/640 |
| 8,028,603 | B2* | 10/2011 | Ishikawa | F16H 55/0833 |
| | | | | 475/180 |
| 2002/0174741 | A1* | 11/2002 | Kobayashi | F16C 33/30 |
| | | | | 74/640 |
| 2005/0124452 | A1* | 6/2005 | Stoianovici | F03C 1/04 |
| | | | | 475/83 |
| 2007/0107546 | A1* | 5/2007 | Tanaka | F16C 19/46 |
| | | | | 74/640 |
| 2007/0157760 | A1* | 7/2007 | Kiyosawa | F16C 19/52 |
| | | | | 74/640 |
| 2008/0173130 | A1* | 7/2008 | Zhang | F16H 49/001 |
| | | | | 74/640 |
| 2011/0190090 | A1 | 8/2011 | Freund et al. | |

FOREIGN PATENT DOCUMENTS

| | | |
|---|---|---|
| JP | 2011-190826 A | 9/2011 |
| JP | 2012-506005 A | 3/2012 |

* cited by examiner

WAVE GENERATOR OF STRAIN WAVE GEARING

TECHNICAL FIELD

The present invention relates to a wave generator of a strain wave gearing, and particularly relates to a wave generator having a needle roller bearing.

BACKGROUND ART

In a wave generator of a strain wave gearing, a ball bearing having flexible inner and outer rings capable of flexing in a radial direction is commonly mounted on an ellipsoidal external peripheral surface of a rigid plug. For the sake of reducing the number of components and making the wave generator smaller and more compact, the strain wave gearings being proposed have an inner ring trajectory surface formed directly in the ellipsoidal external peripheral surface of the rigid plug, skipping the inner ring. Patent Document 1 proposes a winch for civil engineering and construction machinery that incorporates the strain wave gearing of this configuration. Patent Document 2 proposes a strain wave gearing in which an inner ring trajectory surface is formed directly in the ellipsoidal external peripheral surface of the rigid plug, and an outer ring trajectory surface is formed directly in an inner peripheral surface of a flexible externally toothed gear, skipping the inner and outer rings.

The strain wave gearing disclosed in Patent Document 1 is known as a flat strain wave gearing, wherein a cylindrical flexible externally toothed gear is disposed on the inner sides of two rigid internally toothed gears having different numbers of teeth, and the flexible externally toothed gear is made to flex into an ellipsoidal shape and meshed with both rigid internally toothed gears by a wave generator disposed on the inner side of the flexible externally toothed gear.

PRIOR ART DOCUMENTS

Patent Documents

[Patent Document 1] JP 05-132292A
[Patent Document 2] JP 03-99257U

SUMMARY OF THE INVENTION

Problems to be Solved by the Invention

A flat strain wave gearing is in some cases used as a hollow strain wave gearing having a hollow part passing through the center in the axial direction of the device. Wave generators provided with rigid plugs having a through-hole formed in the center are used for such a hollow strain wave gearing. To increase the inside diameter dimension of the hollow part without increasing the outside diameter dimension of the device, a hollow through-hole having a large inside diameter must be formed in the rigid plug. To achieve this, a roller bearing, particularly a needle roller bearing, of less radial thickness than a ball bearing is preferably used in the wave generator.

An object of the present invention, in view of these matters, is to provide a wave generator of a structure suitable for increasing the hollow diameter of a strain wave gearing, and a hollow strain wave gearing having this wave generator.

Means to Solve the Above Problems

To achieve the object described above, according to the present invention, there is provided a wave generator of a strain wave gearing for flexing a flexible externally toothed gear into an ellipsoidal shape to partially mesh with a rigid internally toothed gear, and for moving meshing positions of the two gears in a circumferential direction; the wave generator characterized in comprising:

a rigid plug and a needle roller bearing mounted on an ellipsoidal plug external peripheral surface of the rigid plug;

the needle roller bearing having an ellipsoidal inner ring trajectory surface formed in the plug external peripheral surface, an outer ring capable of flexing in the radial direction, an outer ring trajectory surface formed in the inner peripheral surface of the outer ring, and a plurality of needle rollers mounted in a rollable state between the inner ring trajectory surface and the outer ring trajectory surface;

an inner ring trajectory groove extending in the circumferential direction is formed in the plug external peripheral surface;

the inner ring trajectory surface is formed in a groove bottom surface of the inner ring trajectory groove; and an inner-ring-side restricting surface for restricting the needle rollers from moving in the axis direction is formed in groove side surfaces on both sides of the inner ring trajectory groove.

The wave generator of the strain wave gearing of the present invention has a needle roller bearing, and an inner ring trajectory surface of the needle roller bearing is formed directly in the ellipsoidal external peripheral surface of the rigid plug, skipping the inner ring. Therefore, the thickness of the bearing in the radial direction can be reduced, and a hollow through-hole having a large inside diameter can be formed in the wave generator. Consequently, if the wave generator of the present invention is used, it is possible to achieve a hollow strain wave gearing having a large hollow diameter.

The inner ring trajectory surface is also formed in the bottom surface of the inner ring trajectory groove formed in the ellipsoidal external peripheral surface of the rigid plug. Therefore, the left and right groove side surfaces of the inner ring trajectory groove function as inner-ring-side restricting surfaces for restricting the movement of the needle rollers in the axis direction. Because there is no need to dispose a separate member in order to restrict the movement of the needle rollers in the axis direction, the wave generator can be reduced in size and made more compact.

The inner-ring-side restricting surfaces (groove side surfaces) are preferably side surfaces that correspond to the shapes of both ends of the needle rollers. When both end surfaces of the needle rollers are flat end surfaces orthogonal to the center axis of the needle rollers, the inner-ring-side restricting surfaces are preferably orthogonal side surfaces that are orthogonal to the groove bottom surface. When both ends of the needle rollers are shaped as circular truncated cones tapering outward in the axis direction, the inner-ring-side restricting surfaces are preferably inclined side surfaces that are inclined at an angle corresponding to the conic surfaces of the ends of the needle rollers.

An outer ring trajectory groove extending in the circumferential direction may be formed in the inner peripheral surface of the outer ring, and the groove bottom surface of the outer ring trajectory groove may be an outer ring trajectory surface. In this case, the groove side surfaces on both sides of the outer ring trajectory groove can be used as outer-ring-side restricting surfaces for restricting the needle rollers from moving in the axis direction.

Next, the hollow strain wave gearing of the present invention is characterized in comprising:

a rigid internally toothed gear;

a flexible externally toothed gear disposed on the inner side of the rigid internally toothed gear and capable of meshing with the rigid internally toothed gear;

a wave generator for causing the flexible externally toothed gear to flex into an ellipsoidal shape and partially mesh with the rigid internally toothed gear and causing the meshing positions of the two gears to move in the circumferential direction, the wave generator being disposed on the inner side of the flexible externally toothed gear; and a rotating input shaft composed of a hollow shaft;

the wave generator being provided with the needle roller bearing of the aforedescribed aspect; and the rigid plug of the wave generator being formed integrally in the external peripheral surface of the rotating input shaft.

In the hollow wave generator of the present invention, because the thickness of the wave generator in the radial direction is reduced, the hollow diameter of the hollow part can be increased.

The hollow strain wave gearing of the present invention can be a flat strain wave gearing comprising a first internally toothed gear and a second internally toothed gear disposed along the device axis direction and having different numbers of teeth as the rigid internally toothed gear, the flexible externally toothed gear having a cylinder body capable of flexing in the radial direction and external teeth formed in the external peripheral surface of the cylinder body.

MODE FOR CARRYING OUT THE INVENTION

A hollow strain wave gearing according to an embodiment of the present invention is described below with reference to the drawings.

(Overall Configuration)

Figure 1:
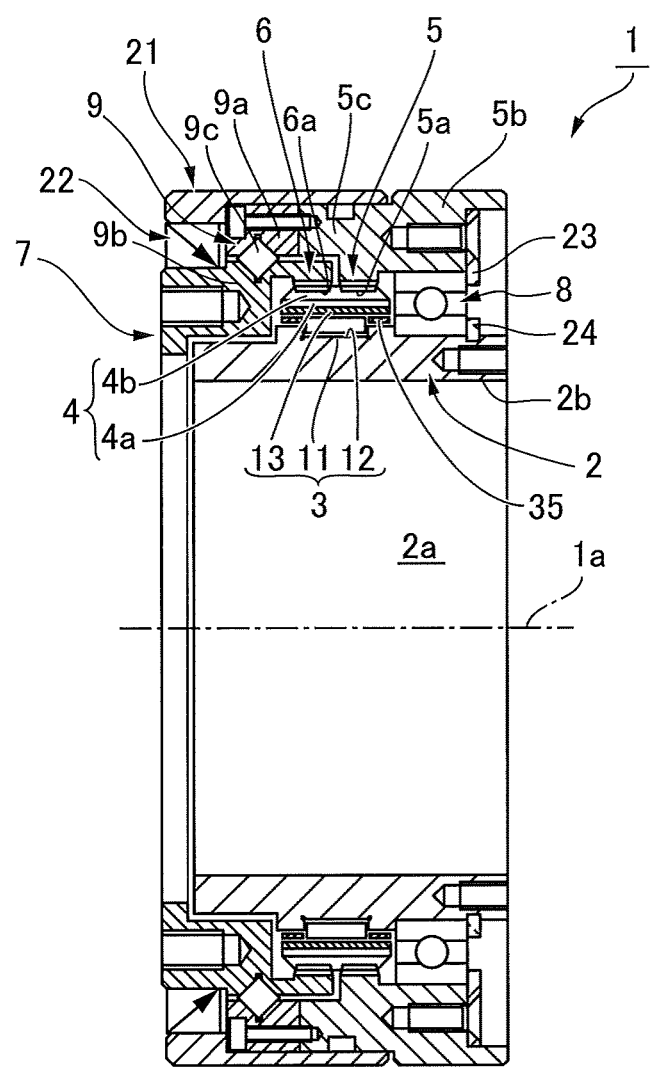
FIG. 1 is a longitudinal cross-sectional view showing a hollow strain wave gearing to which the present invention is applied.

FIG. 1 is a longitudinal cross-sectional view showing a hollow strain wave gearing according to the present embodiment. The hollow strain wave gearing 1 has a hollow input shaft 2, a wave generator 3 that rotates integrally with the hollow input shaft 2, a flexible externally toothed gear 4, a first rigid internally toothed gear 5, a second rigid internally toothed gear 6, and an annular output flange 7. A hollow part 2a of the hollow input shaft 2, circular in cross section, extends through the hollow strain wave gearing 1 in the direction of a device axis 1a.

The hollow input shaft 2 is supported in a rotatable state by the first rigid internally toothed gear 5 via a ball bearing 8. The second rigid internally toothed gear 6 is supported in a rotatably state by the first rigid internally toothed gear 5 via a crossed roller bearing 9. In the strain wave gearing 1, the side that has the output flange 7 in the direction of the device axis 1a is referred to as the rotation output side, and the opposite side is referred to as the rotation input side.

An output shaft (not shown) of a motor is secured via a coupling or the like to a shaft end part 2b on the rotation input side of the hollow input shaft 2. The wave generator 3 is disposed in the external peripheral portion of the hollow input shaft 2, midway along the direction of the device axis 1a. The wave generator 3 has a rigid plug 11 formed integrally in the external peripheral surface portion of the hollow input shaft 2, and a needle roller bearing 13 mounted on an ellipsoidal plug external peripheral surface 12 of the rigid plug 11.

The cylindrical flexible externally toothed gear 4 is disposed on the external peripheral side of the wave generator 3. The flexible externally toothed gear 4 has a cylinder body 4a capable of flexing in the radial direction, and external teeth 4b formed in the external peripheral surface of the cylinder body 4a. The first rigid internally toothed gear 5 and the second rigid internally toothed gear 6 are coaxially disposed on the external peripheral side of the flexible externally toothed gear 4, adjacent to each other along the device axis 1a. The first rigid internally toothed gear 5 is disposed on the rotation input side, and the second rigid internally toothed gear 6 is disposed on the rotation output side. The flexible externally toothed gear 4 is made to flex into an ellipsoidal shape by the wave generator 3. The external teeth 4b at both major axis ends of the flexible externally toothed gear 4 flexed into an ellipsoidal shape are respectively meshed with first internal teeth 5a and second internal teeth 6a of the first and second rigid internally toothed gears 5, 6.

In the first rigid internally toothed gear 5, the external peripheral portion protrudes in an annular shape on both the rotation input side and the rotation output side, forming an input-side annular part 5b and an output-side annular part 5c. The ball bearing 8 is mounted between the input-side annular part 5b and the circular external peripheral surface portion of the hollow input shaft 2 that is near the rotation input side with respect to the rigid plug 11.

An outer ring 9a of the crossed roller bearing 9 is secured in a fastened manner coaxially to the annular end surface in the output-side annular part 5c of the first rigid internally toothed gear 5. An annular inner ring 9b integrally formed in the second rigid internally toothed gear 6 is disposed on the inner side of the outer ring 9a. An annular trajectory, rectangular in cross section, is formed between the outer ring 9a and the inner ring 9b, and a plurality of rollers 9c are mounted in a rotatable state in this trajectory. The output flange 7 protruding in an annular shape toward the rotation output side is integrally formed in the inner ring 9b. A load-side member (not shown) is secured in a fastened manner to the output flange 7.

A cylindrical cover 21 is attached to the hollow strain wave gearing 1 from the rotation output side. The cylindrical cover 21 covers the outer ring 9a of the crossed roller bearing 9 and the first rigid internally toothed gear 5. An oil seal 22 is mounted on the inner side of the rotation-output-side end of the cylindrical cover 21, sealing the rotation-output-side end surface of the crossed roller bearing 9. An annular outer ring stopper 23 is secured in a fastened manner to the rotation-input-side end surface of the input-side annular part 5b of the first rigid internally toothed gear 5. An annular inner ring stopper 24 is fastened to the external periphery of the shaft end part 2b of the hollow input shaft 2.

In the hollow strain wave gearing 1 thus configured, the number of teeth of the first rigid internally toothed gear 5 is 2n greater (n being a positive integer) than the number of teeth of the second rigid internally toothed gear 6. Commonly, there are two more teeth. The number of teeth of the second rigid internally toothed gear 6 and the number of teeth of the flexible externally toothed gear 4 are the same. The first rigid internally toothed gear 5 is secured to a stationary-side member (not shown) so as to not rotate. When the wave generator 3 is rotated at a high speed by a motor or the like, the meshing positions of the external teeth 4b and the first and second internal teeth 5a, 6a move in the circumferential direction. As a result, the flexible externally toothed gear 4 rotates at a rotational speed that is reduced according to the difference in the number of teeth between the first rigid internally toothed gear 5 and the flexible externally toothed gear 4. The second rigid internally toothed gear 6, which has the same number of teeth as the flexible externally toothed gear 4, rotates integrally with the flexible externally toothed gear 4. Therefore, reduced rotation is outputted to the load-side member from the output flange 7.

(Wave Generator)

Figure 2:
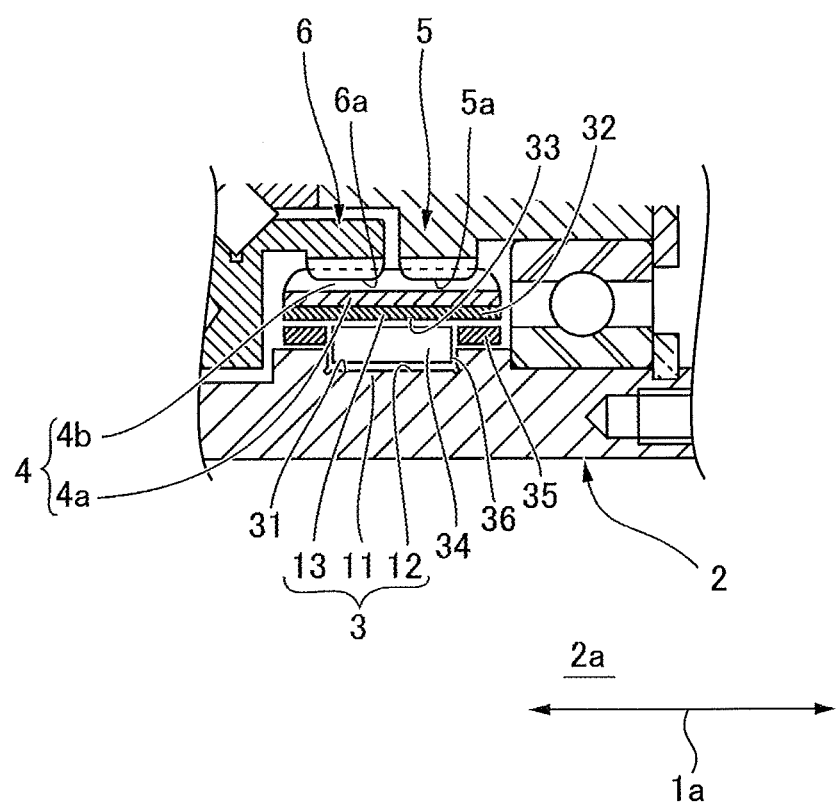
FIG. 2 is a partial cross-sectional view showing a portion including the wave generator taken out from FIG. 1.
Figure 3A:
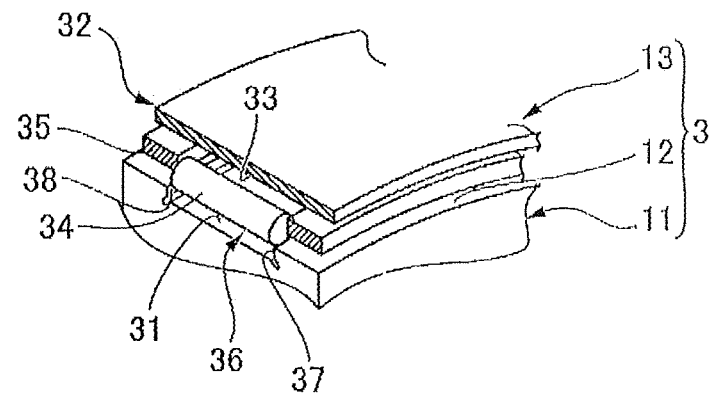
FIG. 3a and FIG. 3b are a partial perspective view and a partial cross-sectional view showing the wave generator of FIG. 2.
Figure 3B:
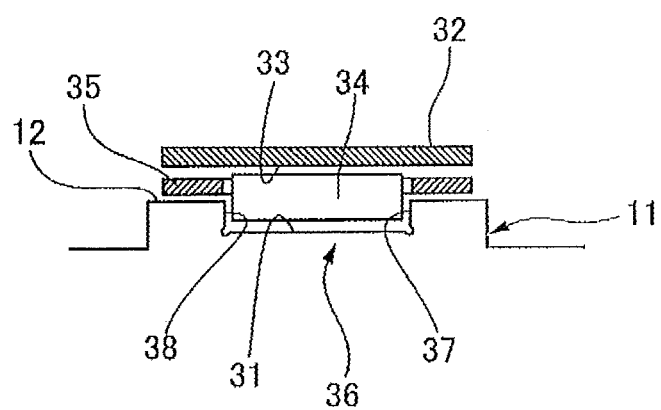

FIG. 2 is a partial cross-sectional view showing a portion including the wave generator 3 taken out from the hollow strain wave gearing 1. FIGS. 3(a) and (b) are a partial perspective view and a partial cross-sectional view showing the wave generator 3. As shown, the wave generator 3 has the rigid plug 11, and the needle roller bearing 13 mounted to the ellipsoidal plug external peripheral surface 12 of the rigid plug 11. The needle roller bearing 13 has an ellipsoidal inner ring trajectory surface 31 formed in the ellipsoidal plug external peripheral surface 12, an outer ring 32 capable of flexing in the radial direction, an outer ring trajectory surface 33 formed in the inner peripheral surface of the outer ring 32, and a plurality of needle rollers 34 mounted between the inner ring trajectory surface 31 and the outer ring trajectory surface 33. The needle rollers 34 are held in a rollable state in constant intervals in the circumferential direction by a cylindrical retainer 35.

Formed in the ellipsoidal plug external peripheral surface 12 of the rigid plug 11 is an inner ring trajectory groove 36 extending in the circumferential direction and having a constant width and a constant depth. The inner ring trajectory surface 31 is formed in the groove bottom surface of the inner ring trajectory groove 36. The groove side surfaces on both sides of the inner ring trajectory groove 36 function as inner-ring-side restricting surfaces 37, 38 for restricting the needle rollers 34 from moving in the center axis direction thereof. In the present example, both end surfaces of the needle rollers 34 are orthogonal end surfaces that are orthogonal to the center axis of the rollers. Corresponding to this, the inner-ring-side restricting surfaces 37, 38 on both sides of the inner ring trajectory groove 36 are orthogonal side surfaces that are orthogonal to the inner ring trajectory surface 31.

An outer ring trajectory groove may be formed in the inner peripheral surface of the outer ring 32, and the bottom surface of this outer ring trajectory groove may be an outer ring trajectory surface. In this case, groove side surfaces on both sides of the outer ring trajectory groove can be utilized as outer-ring-side restricting surfaces for restricting the needle rollers 34 from moving in the center axis direction thereof.

Figure 4A:
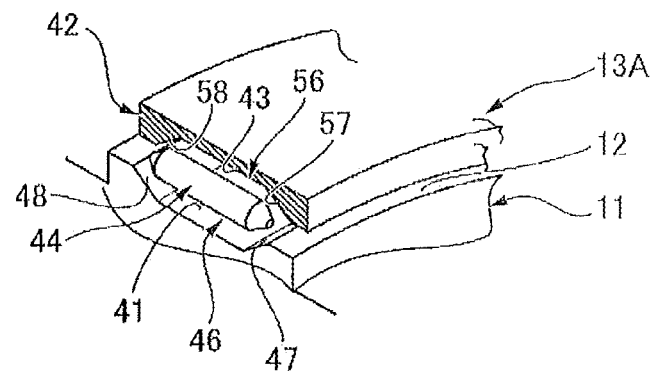
FIG. 4a and FIG. 4b are a partial perspective view and a partial cross-sectional view showing another example of the wave generator of FIG. 2.
Figure 4B:
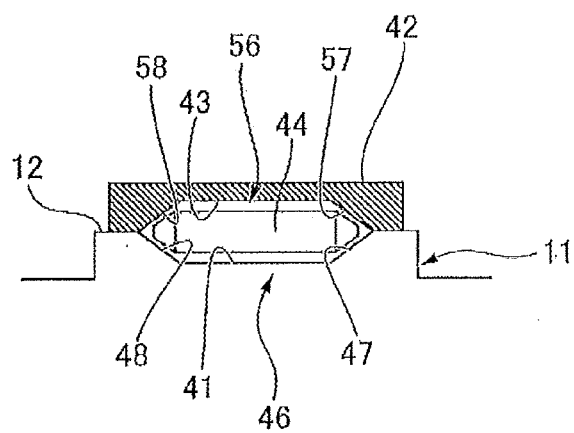

FIGS. 4(a) and (b) are a partial perspective view and a partial cross-sectional view showing another example of the needle roller bearing 13. The needle roller bearing 13A shown here has an ellipsoidal inner ring trajectory surface 41 formed in the ellipsoidal plug external peripheral surface 12, an outer ring 42 capable of flexing in the radial direction, an outer ring trajectory surface 43 formed in the inner peripheral surface of the outer ring 42, and a plurality of needle rollers 44 mounted in a rollable state between the inner ring trajectory surface 41 and the outer ring trajectory surface 43.

An inner ring trajectory groove 46 extending in the circumferential direction and having a constant width and a constant depth is formed in the ellipsoidal plug external peripheral surface 12 of the rigid plug 11. The inner ring trajectory surface 41 is formed in the groove bottom surface of the inner ring trajectory groove 46. The groove side surfaces on both sides of the inner ring trajectory groove 46 function as inner-ring-side restricting surfaces 47, 48 for restricting the needle rollers 44 from moving in the center axis direction. Both end surfaces of the needle rollers 34 are shaped as circular truncated cones tapering outward. Corresponding to this, the inner-ring-side restricting surfaces 47, 48 on both sides of the inner ring trajectory groove 46 are inclined side surfaces that are inclined outward at an angle less than 90 degrees in relation to the surfaces orthogonal to the inner ring trajectory surface 41.

An outer ring trajectory groove 56 extending in the circumferential direction and having a constant width and a constant depth is formed in the inner peripheral surface of the outer ring 42. The outer ring trajectory surface 43 is formed in the groove bottom surface of the outer ring trajectory groove 56. The groove side surfaces on both sides of the outer ring trajectory groove 56 function as outer-ring-side restricting surfaces 57, 58 for restricting the needle rollers 44 from moving in the center axis direction. The outer-ring-side restricting surfaces 57, 58 are inclined side surfaces that are inclined at an angle corresponding to the conic surfaces of both ends of the needle rollers 44.

The example described above is an example in which the present invention is applied to a wave generator of a flat strain wave gearing. The present invention can similarly be applied to a wave generator of a cup-shaped strain wave gearing or a silk-hat-shaped strain wave gearing.

The invention claimed is:

1. A wave generator of a strain wave gearing for flexing a flexible externally toothed gear into an ellipsoidal shape to partially mesh with a rigid internally toothed gear, and for moving meshing positions of the two gears in a circumferential direction; the wave generator comprising:

a rigid plug having an ellipsoidal shape and a needle roller bearing mounted on an ellipsoidal plug external peripheral surface of the rigid plug, wherein the needle roller bearing has an ellipsoidal inner ring trajectory surface formed in the plug external peripheral surface, an outer ring capable of flexing in a radial direction, an outer ring trajectory surface formed in an inner peripheral surface of the outer ring, and a plurality of needle rollers mounted in a rollable state between the inner ring trajectory surface and the outer ring trajectory surface;

an inner ring trajectory groove is formed in the plug external peripheral surface and extends in a circumferential direction of the plug external peripheral surface;

the inner ring trajectory surface is formed in a groove bottom surface of the inner ring trajectory groove; and an inner-ring-side restricting surface for restricting the needle rollers from moving in an axis direction thereof is formed in groove side surfaces on both sides of the inner ring trajectory groove; and an outer ring trajectory groove is formed in an inner peripheral surface of the outer ring and extends in a circumferential direction of the inner peripheral surface;

the outer ring trajectory surface is formed in a groove bottom surface of the outer ring trajectory groove; and, outer-ring-side restricting surfaces for restricting the needle rollers from moving in the axis direction thereof are formed on groove side surfaces on both sides of the outer ring trajectory groove.

2. The wave generator of the strain wave gearing according to claim 1, wherein the groove side surfaces are:

orthogonal side surfaces that are orthogonal to the groove bottom surface, or inclined side surfaces that are inclined at an angle less than 90 degrees in relation to surfaces orthogonal to the groove bottom surface.

3. A hollow strain wave gearing characterized in comprising:

a rigid internally toothed gear;

a flexible externally toothed gear disposed on an inner side of the rigid internally toothed gear and capable of meshing with the rigid internally toothed gear;

a wave generator for causing the flexible externally toothed gear to flex into an ellipsoidal shape and partially mesh with the rigid internally toothed gear and for causing meshing positions of the two gears to move in a circumferential direction, the wave generator being disposed on an inner side of the flexible externally toothed gear; and a rotating input shaft composed of a hollow shaft, wherein the wave generator is that according to claim 1, and the rigid plug of the wave generator is formed integrally in an external peripheral surface of the rotating input shaft.

4. The hollow strain wave gearing according to claim 3, wherein a first internally toothed gear and a second internally toothed gear disposed along a device axis direction and having different numbers of teeth are provided as the rigid internally toothed gear, and the flexible externally toothed gear has a cylinder body capable of flexing in a radial direction and external teeth formed in an external peripheral surface of the cylinder body.

* * * * *